United States Patent [19]

Simard et al.

[11] Patent Number: 5,716,653
[45] Date of Patent: Feb. 10, 1998

[54] PROCESS FOR BREWER'S YEAST DEBITTERING

[75] Inventors: Ronald E. Simard, Ste. Foy; Mohammed Bouksaim, Quebec, both of Canada

[73] Assignee: Universite Laval, Cite Universitaire, Quebec, Canada

[21] Appl. No.: 513,040

[22] Filed: Aug. 9, 1995

Related U.S. Application Data

[63] Continuation-in-part of Ser. No. 348,947, Nov. 26, 1994, abandoned, which is a continuation of Ser. No. 15,153, Feb. 11, 1993, abandoned.

[51] Int. Cl.$^6$ .................................................. A23J 1/18
[52] U.S. Cl. .................. 426/60; 426/61; 426/62; 426/429; 426/653; 426/656
[58] Field of Search ........................... 426/31, 61, 62, 426/425, 429, 600, 656, 60, 653

[56] References Cited

U.S. PATENT DOCUMENTS 3,924,006  12/1975  Grylls ............................ 426/24

OTHER PUBLICATIONS

R. Lewis, Sr. Hawley'Condensed Chemical Dictionary, VNR, New York, 1993 pp. 507–508.
Japanese Abstract (No. 55–162983 (A)) of Japanese Patent Application No. JP 5471025, dated Dec. 18, 1980.
Nand, K. (1987). "Debittering of spent brewer's yeast for food purposes". Die Nahrung 31(2): 127–131.

*Primary Examiner*—Donald E. Czaja
*Assistant Examiner*—Curtis E. Sherrer
*Attorney, Agent, or Firm*—Cushman Darby & Cushman IP Group of Pillsbury Madison & Sutro LLP

[57] ABSTRACT

This invention relates to a process for debittering spent brewer's yeast, aiming at maximal efficiency with minimal impact on yeasts for their further use as live cells. The process consists in bringing a yeast suspension in contact with a surfactant containing unsaturated fatty acids, like Tween 80® (0.2% to 20% v/v), adjusting pH to 10.0 with NaOH 2N and agitating during 5 minutes at 50 rpm and 50° C. A bitterness reduction of 98% is obtained, without affecting yeast viability or protein content. Furthermore, the debittered yeasts treated with 20% Tween 80® can be reactivated (viability of 100% and increased production of $CO_2$) by growing them in a suitable medium for a sufficient time (about two to six hours). These reactivated yeasts have restored biological properties which are expected to allow the use of these spent yeasts in complete or partial replacement of new yeasts in bakery industry and in spirit and beer fabrication. This application for an industrial by-product brings a plus-value by exploiting its biological activity and its nutritional value and furthermore, represents an interesting solution for an environmental problem.

8 Claims, 8 Drawing Sheets

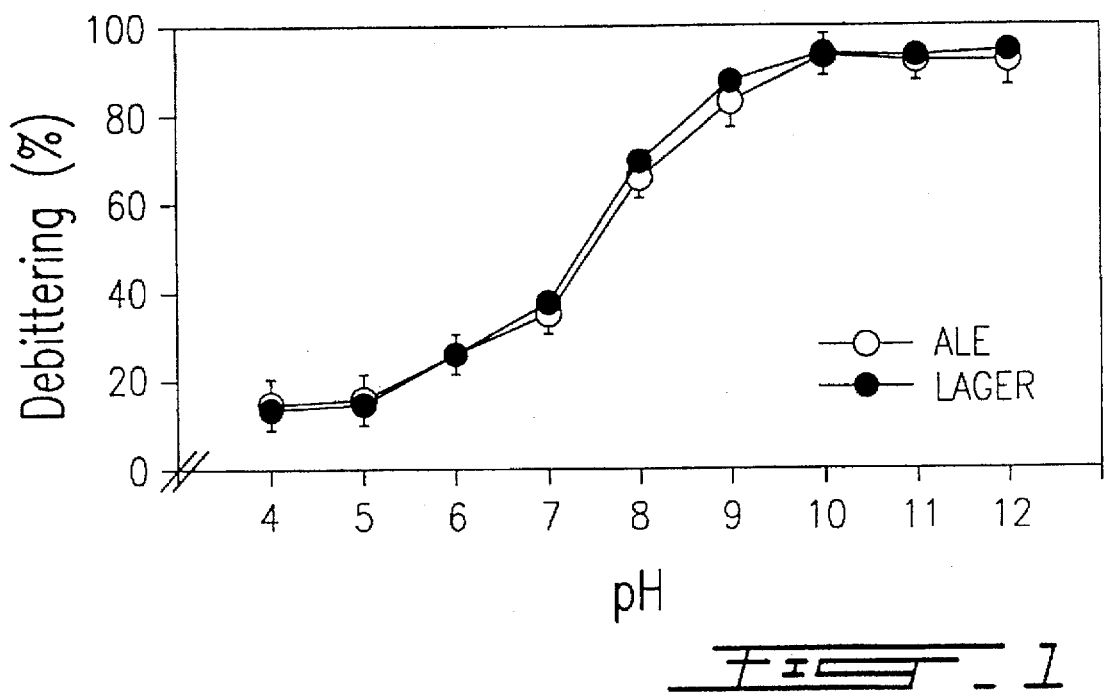
FIG_1
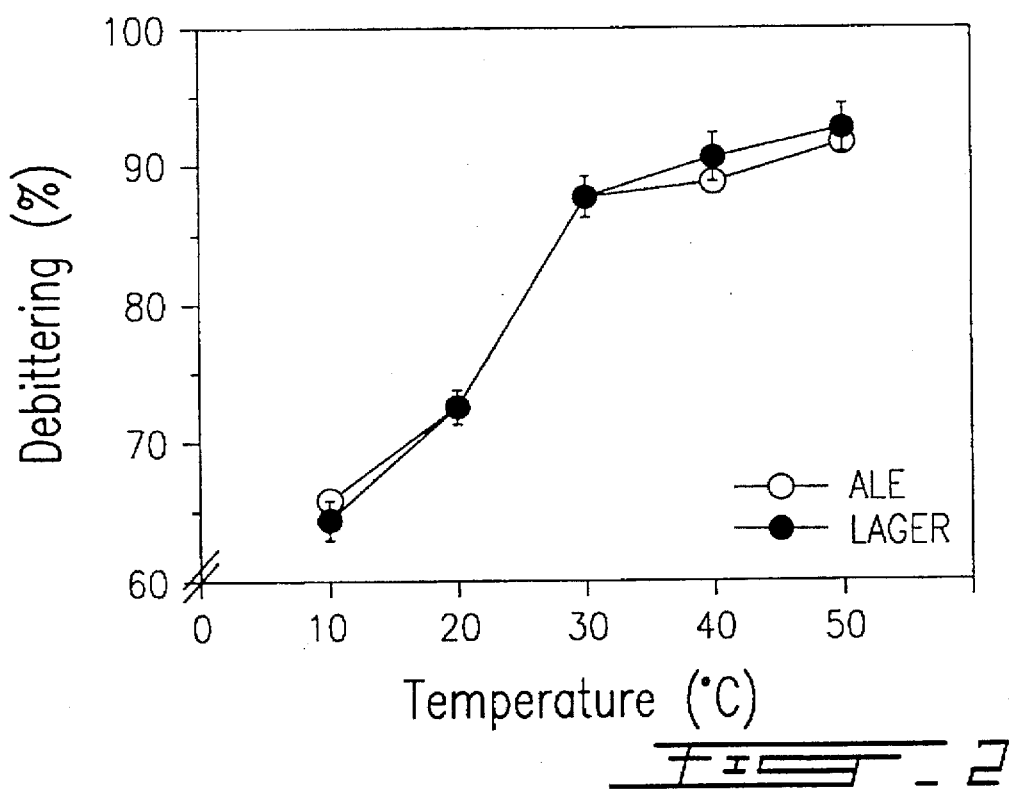
FIG_2

PROCESS FOR BREWER'S YEAST DEBITTERING

This is a continuation-in-part of application Ser. No. 08/348,947, filed Nov. 26, 1994, now abandoned, which was a continuation of application Ser. No. 08/015,153, filed Feb. 11, 1993, now abandoned.

FIELD OF THE INVENTION

This invention relates to a process for debittering spent brewer's yeast. Brewery industry generates a large quantity of yeast as a by-product. On the other hand, the importance of yeast is well recognized on account of its high contents of protein, vitamin B-complex and minerals (Burton, 1943; Peppler, 1970). However, spent brewer's yeast as such cannot be used in human or animal food owing to the presence of a strong bitter flavor. Hops constituents such as humulone and lupulone would be mainly responsible for bitterness (Bauer et al., 1975; Krauss, 1971). A number of methods have been developed for debittering spent brewer's yeast based on the physico-chemical properties of these bitter compounds such as solubility in organic solvents or reaction with sodium ions resulting in water soluble salts (Anonymous, 1983). Washing with organic solvents (methanol, acetone) or mild alkalies (sodium or ammonium carbonate) East et al., 1966; Modic et al., 1978) have been found not enough efficient or economical (Nand, 1987). Washing with strong alkali (sodium hydroxide) has been satisfactorily used for a long time by industries although being much time consuming with numerous washing steps at various pH (Burton, 1943). Ebiosu claimed in a Japanese patent application published under number JP 82035631 that yeast bitter taste could be removed without cell rupture when yeast was in contact, for less than a minute, with alkaline solution (sodium hydroxide or sodium carbonate) at pH 9 to 11 and temperature 2° to 30° C. More recently, Nand (1987) has improved the process by washing only once with NaOH 2N and then twice in water. The author had determined the optimal pH as 10.00 and the optimal reaction temperature as 50° C. for a fixed reaction time of 30 minutes. He claimed a complete debittering of yeast without any deleterious effects in its nutritive value. However, his results were based only on organoleptic evaluation of bitterness.

Starting with the Nand Process (1987), we developed an improved method, with our results based on quantitative measurements of bitterness rather than on organoleptic evaluation, aiming at maximal efficiency with minimal impact on yeast for their further use as live cells in bakery industry. Most of the uses suggested in the literature for debittered brewer's yeast are as a food supplement in bread (Kann et al., 1982); Alian et al., 1983; Asenova et al., 1984), in pasta (Jeane, 1977) in fodder (Kann et al., 1982) and others (Burton, 1943; Hoggan, 1979). Complement for aroma in cocoa-like product (Anonymous, 1984) or in meat products and cheese spreads (East et al., 1966; Modic et al., 1977; Anonymous, 1977) are other possible uses. Some research has been pursued also on enzymatic activity of such cells to be used for inversion of sugar (Filippovskii, 1985) or for proteolytic activity (Smith, 1979). The potential of brewer's yeast in spirit production fermentation has also been studied by Hoggan (1979). All these applications are interesting for disposing of a by-product that would otherwise be thrown into the environment. However, except for the last application (spirit production), the cells did not have to be live and therefore the debittering process did not have to be monitored as strictly as if the resulting product needed to show a biological activity as it is the case in the present application. We suggest that spent brewer's yeast could be used for total or partial replacement of baker's yeast for gas production in bread or other bakery product and for ethanol (spirit and beer) production.

Jakubczyk et al., 1972 conducted bread making trials with debittered brewer's yeast and concluded that the ratio of brewer's yeast/baker's yeast should not be more than 1:4. Few years later, the same group (Grzymowski et al., 1979) published results on baking test with acid debittered yeast. This yeast alone proved to be inefficient in fermenting wheat flour dough. These results can be associated with the debittering process itself which could affect the biological activity of brewer's yeast. It has to be remembered that these cells are already weakened by the prolonged contact with alcohol during beer production.

DESCRIPTION OF THE INVENTION

We developed a debittering process which, on first hand, has a minimal impact on yeast viability (Example 4). This process is an improvement over the process described by Nand (1987) residing principally in the addition of a surfactant, for instance Tween 80® (polyoxyethylene sorbitan monooleate) (0,2%), for achieving a more complete debittering of spent brewer's yeasts.

On the other hand, this process was further ameliorated by restoring the biological functions of spent brewer's yeasts. This process includes steps of debittering with a larger quantity of Tween 80® (polyoxyethylene sorbitan monooleate) (20%) and of reactivation of the so debittered yeasts in a suitable medium for a time period varying from 2 to 6 hours.

Tests of $CO_2$ production were conducted on yeasts debittered with 0.2% Tween 80® (polyoxyethylene sorbitan monooleate) and with 20% Tween 80® (polyoxyethylene sorbitan monooleate) followed by reactivation.

Bakery tests have been conducted and results (Example 5) show that brewer's yeast, debittered by our process (with 0.2% Tween 80® (polyoxyethylene sorbitan monooleate)), can be used advantageously with baker's yeast in a 1:1 mixture or, alone, by increasing 2–3 times the yeast quantity necessary to obtain the required $CO_2$ production. As the $CO_2$ production could be greatly improved by debittering spent brewer's yeasts with 20% Tween 80® (polyoxyethylene sorbitan monooleate) and reactivating them, one can expect that the second embodiment of the invention will provide a biologically restored yeast usable in bread-making alone and not necessarily in excess in complete replacement of baker's yeast. The biologically restored yeast could also be recycled in the making of alcoholized beverages.

Our results represent thus an improvement as the brewer's yeast, debittered by our process, can be used effectively in the bakery and in the spirit industries. Furthermore, the rather large quantities of brewer's yeast necessary when used alone and in excess (according to the first embodiment of the invention) justifies the set-up of a more efficient debittering process.

This invention provides a process whose primary goal is to use spent brewer's yeast as a valuable nutritional source of protein, vitamins and minerals and, at the same time, provides an interesting solution to an environmental problem.

The present invention will be more readily understood by the following Examples and Figures, which purpose is to illustrate rather than to limit its scope.

FIG. 1 represents the effect of pH on bitterness reduction;

FIG. 2 represents the effect of temperature on bitterness reduction;

Figure 8:
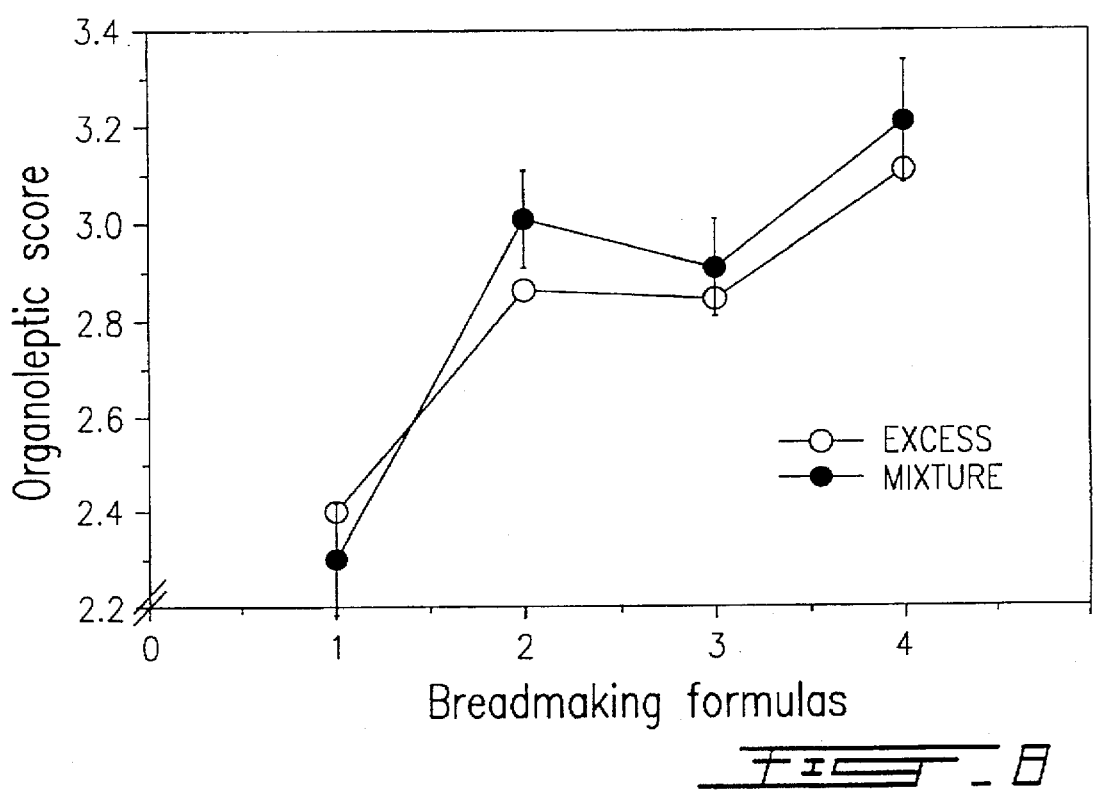
Figure 9A:
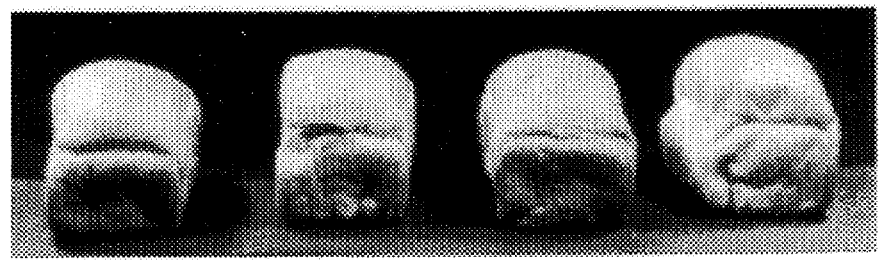
Figure 9B:
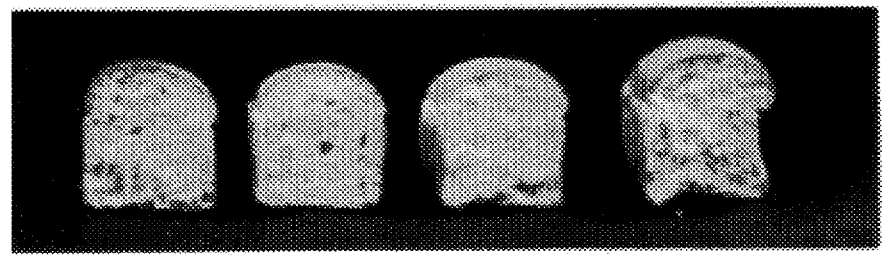
Figure 10A:
Figure 10B:
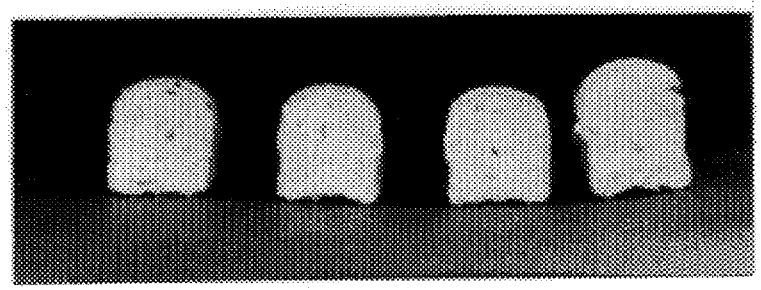
Figure 11:
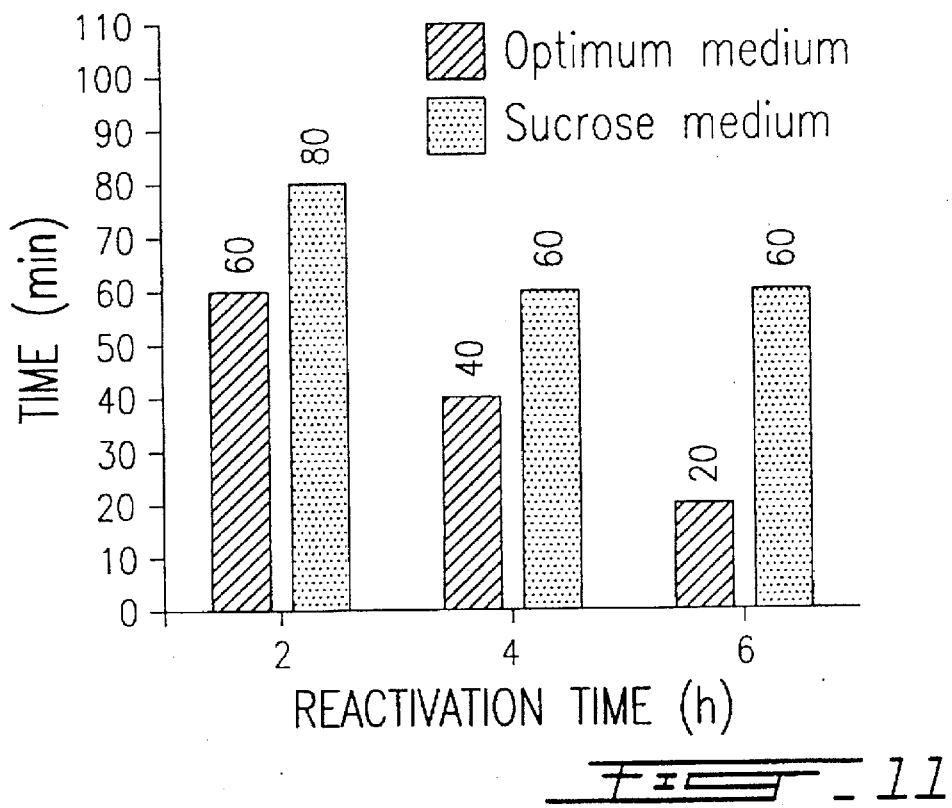
Figure 12:
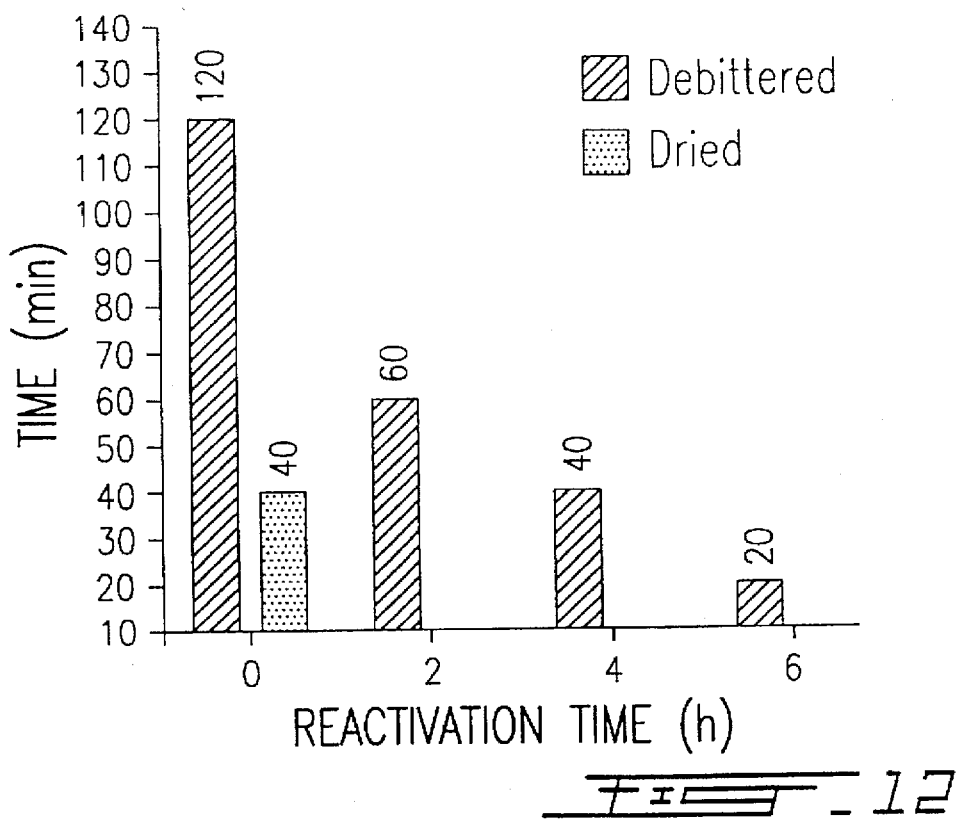
Figure 13:
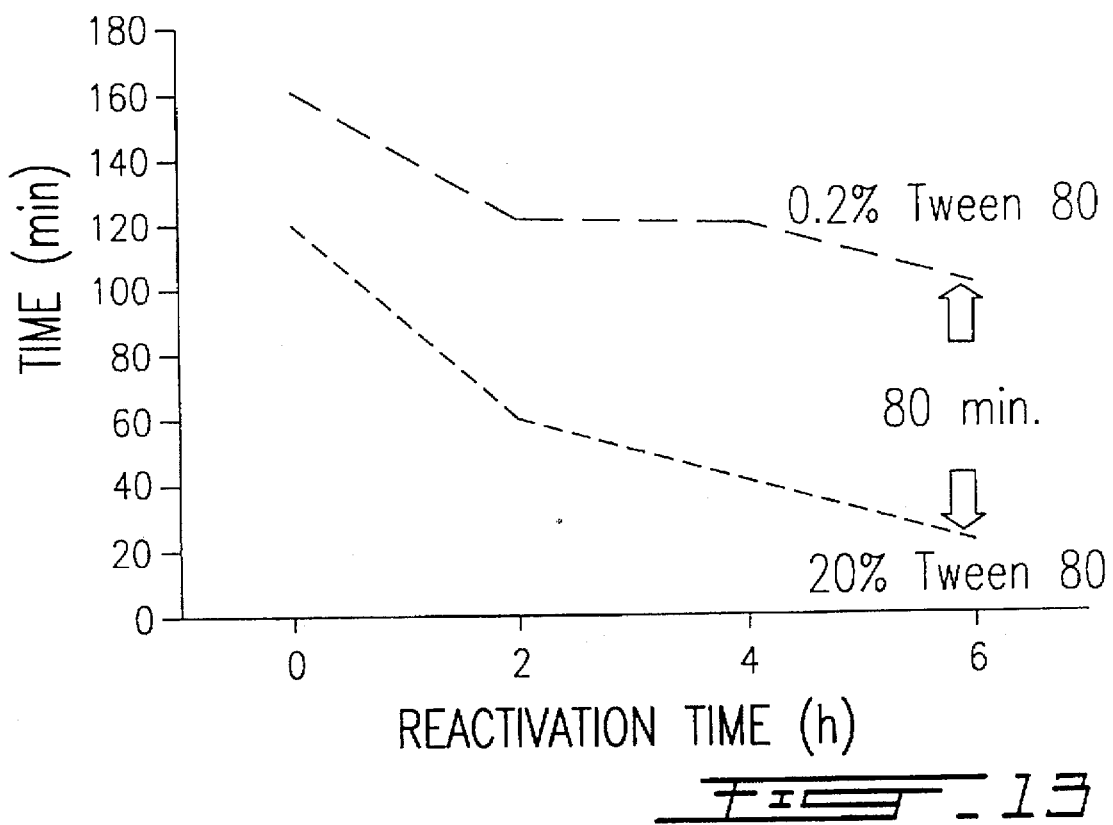

FIG. 8 shows the organoleptic evaluation of breads made with a mixture of debittered brewer's yeast (DBY) and baker's yeast (BKY) or with DBY used alone and in excess; DBY has been debittered in presence of 0.2% Tween 80® (polyoxyethylene sorbitan monooleate); numbers 1 to 3 on the abscissa correspond respectively to both mixture ratios (DBY:BKY 2:1, 1:1 and 1:2) and % in excess of DBY (6, 7.5 and 9%, w/w flour); number 4 corresponds to the control (DBY:BKY 0:1 or BKY 3%, w/w flour);

FIGS. 9a and 9b are respectively photographs of breads and transversal sections thereof made with baker's yeast and with various mixtures of debittered brewer's yeast and baker's yeast; brewer's yeast has been debittered in presence of Tween 80® (polyoxyethylene sorbitan monooleate); from the left to the right, breads correspond to bread numbers 1, 2, 3 and 4, of FIG. 8;

FIGS. 10a and 10b are respectively photographs of breads and transversal sections thereof made with baker's yeast and with debittered brewer's yeast used alone and in excess; debittering has been conducted in presence of Tween 80200 (polyoxyethylene sorbitan monooleate); from the left to the right, breads correspond to bread numbers 1, 2, 3 and 4, of FIG. 8;

FIG. 11 illustrates the time of production of the same quantity of $CO_2$ by spent brewer's yeast debittered in presence of 20% Tween 80® (polyoxyethylene sorbitan monooleate) and reactivated in optimal medium or in sucrose medium;

FIG. 12 illustrates the time of production of the same quantity of $CO_2$ by spent brewer's yeast debittered in presence of 20% Tween 80® (polyoxyethylene sorbitan monooleate) and reactivated in optimal medium compared to dry brewer's yeast; and FIG. 13 shows the difference in the production of the same quantity of $CO_2$ between spent brewer's yeast debittered in presence of 0.2% and 20% Tween 80® (polyoxyethylene sorbitan monooleate).

EXAMPLE 1

Two brewery yeast strains have been chosen for the experiment: *Saccharomyces cerevisiae* (Ale) and *S. carlsbergensis* (Lager). They were purchased from a local amateur beer and wine shop and grown in conditions similar to those in breweries. The culture medium, to produce yeast biomass, was constituted of liquid hops extract supplemented with 1.25% malt extract (85% solids). The fermentation was carried out at 30° C., with agitation at 150 rpm and air admission at 600 $mL.min^{-1}$. Fermentation was stopped after 48–72 h, the cells were washed twice and then resuspended (10% solids) in demineralized water for debittering treatment.

The process consisted in adding 2N NaOH to yeast suspension to adjust pH to the required value. The treatment conditions were, in a first step, fixed to 150 rpm, 50° C. and 30 minutes for agitation speed, temperature and reaction time, respectively, following the Nand Process (1987). Bitterness was evaluated, before and after treatment, with the method recommended by the European Brewery Convention (Bishop, 1967). This method consists in mixing yeast cells with 2,2,4-trimethylpentane, reading the mixture optical density at 275 nm with a spectrophotometer and calculating the bitterness value with the following equation:

$$E.B.U. \text{ (European Bitterness Units)} = \text{Optical Density}_{275} \times 50$$

Physico-chemical analyses were also done on freeze-dried yeasts: dry matter, total nitrogen, fat, ash (Marth, 1978) and color (Dodds et al., 1991). Yeast viability, before and after debittering, was determined by growth on Sabouraud Dextrose agar (Difco No. 0109-2) prepared as recommended by manufacturer and by methylene blue staining (Rodmey, 1987). Experiments were repeated five times and data analyzed statistically (Montgomery, 1976).

pH of reaction was first optimized while other conditions, temperature, time and agitation speed, maintained constant at 50° C., 30 minutes and 150 rpm, respectively, would be studied in further steps. The agitation speed was fixed following our expertise, this parameter having not been studied or even specified by Nand (1987). Debittering was experimented at pH ranging from 4.0 to 12.0. E.B.U. observed at pH 4.0, 10.0 and 12.0 were 9.00, 0.75 and 0.95 units respectively for *Saccharomyces cerevisiae* (Ale) with the pH 10.0 result corresponding to a maximal value of 93% of bitterness removal (FIG. 1). The same was observed for *S. carlsbergensis* (Lager) with a maximum debittering reduction of 95% at pH 10.0. These results agree with Nand (1987) who also observed maximal debittering at pH 10.0.

Temperature effect on debittering was then determined. While maintaining pH, reaction time and agitation of yeast suspension constant at 10.0, 30 minutes and 150 rpm respectively, temperature of 10, 20, 30, 40 and 50° C. were tested. Temperature higher than 50° C. should not be used to avoid adverse chemical reactions such as caramelization (Nand, 1987). Removal of bitterness increases with temperature and maximal responses of 92 and 94% for *S. cerevisiae* and *S. carlsbergensis*, respectively, were obtained at 50° C. (FIG. 2). Our results confirmed, with measured values of E.B.U., those obtained by Nand (1987) with organoleptic evaluation. However, while this author concluded that his process removed completely the bitter constituents, we judged that the treatment could still be improved, keeping in mind the biological activity of debittered yeast and also economical aspects.

Figure 3:
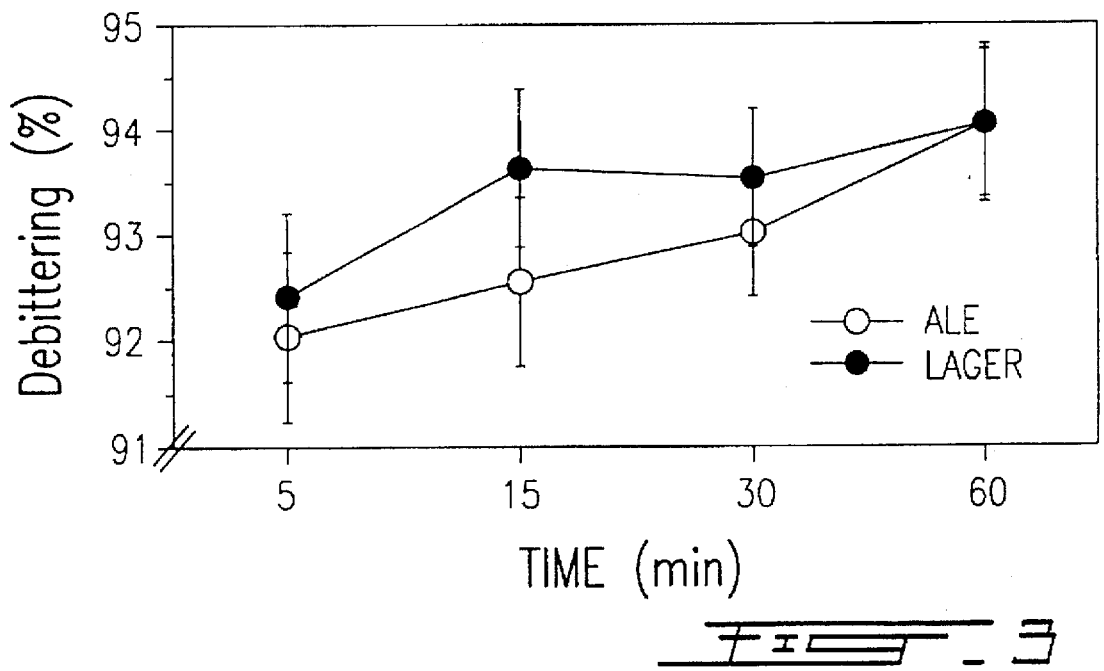
FIG. 3 represents the effect of time on bitterness reduction.

The next assays permitted to determine the minimal reaction time for maximal debittering. Periods of 5, 15, 30 and 60 minutes at constant pH, temperature and agitation of 10.0, 50° C. and 150 rpm respectively were studied. Bitterness reduction for both yeasts (Ale and Lager) was 92 and 94%, respectively, after reaction times of 5 to 60 minutes (FIG. 3). As the values obtained after 5 or 60 minutes are not significantly different (p<0.05), it is suggested that debittering occurs very rapidly at alkaline pH. Consequently, in order to minimize the treatment effect on yeast viability and for economical reasons, we retained the 5-minute reaction time as sufficient for debittering.

To complete the process optimization, the effect of agitation speed was then studied. As 150 rpm assured a violent vortex to the yeast suspension, more moderate speeds (50 and 100 rpm) were tested under optimal conditions (pH 10.0, 50° C. and 5 minutes). Both speeds showed the same 94% bitterness reduction for both yeast strains (Ale and Lager, results not shown). Therefore, moderate agitation (50 rpm) was selected to minimize the treatment impact on yeast cells.

As can be seen from our results, the debittering process using strong alkali could be optimized further than did Nand (1987) by decreasing the necessary reaction time and agitation speed, which both represent improvement on a biological and economical point of view. However, our results, based on quantitative measurements, show that debittering values could still be improved, at the opposite of Nand (1987) who evaluated that the process could not be more effective, based on organoleptic evaluation.

To our knowledge, no other process can be more effective and still economical, than washing with strong alkali. That led us to other experiments improving furthermore the process optimized as described above.

EXAMPLE 2

Debittering is assured by the chemical reaction between bitter compounds and sodium ions ($Na^{3O}$) resulting in salts soluble in aqueous phase. Hops bitter compounds are then deadsorbed from the yeasts which can then be reused. These reactions being subjected to surface tension phenomena, our working hypothesis was that the addition of surfactants to yeast suspension would promote the formation of hydrophillic complexes between bitter compounds and surfactants, increasing then their solubility in the aqueous phase. Detergents like polyoxyethylenesorbitans, commercially known as Tweens®, were particularly studied for their capacity to increase bitter compounds solubility.

Figure 4:
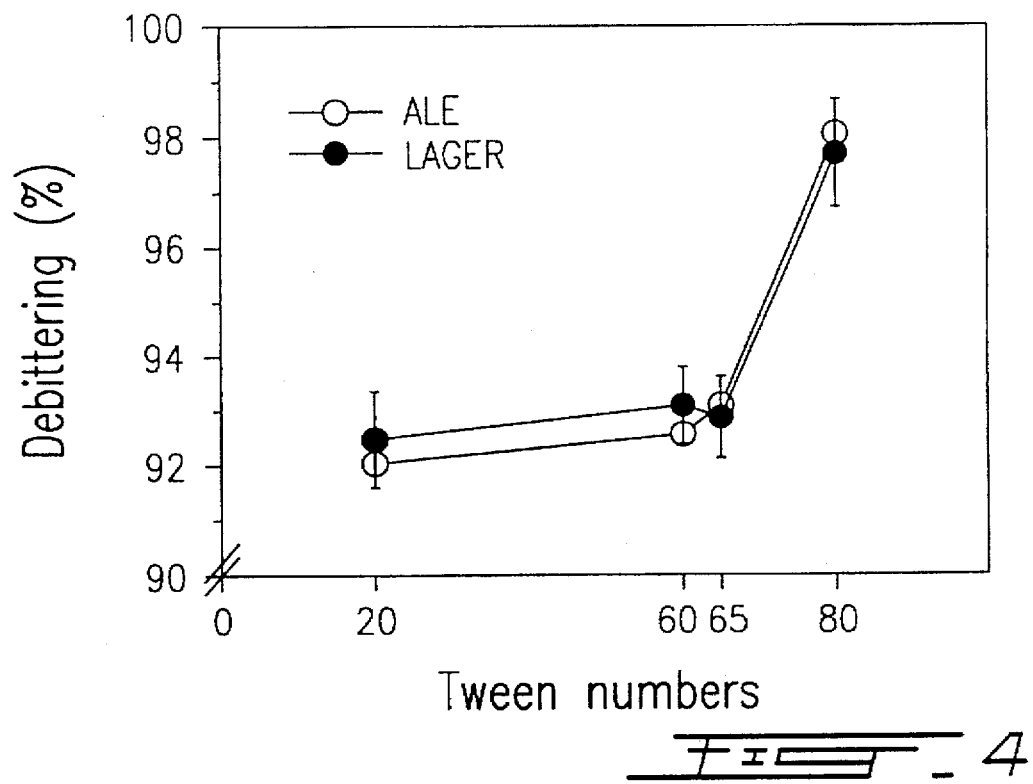
FIG. 4 represents the effect of surfactants on bitterness reduction.

Tweens of different capacities in modifying surface tension, corresponding to the numbers of 20, 60, 65 and 80, were studied at optimal debittering conditions (pH 10.0, 50° C., 5 minutes and 50 rpm). The detergents were added to the yeast suspension before pH adjustment at a 0.2% (v/v) concentration. Results show that a maximal bitterness reduction of 98% was obtained with Tween 80® (polyoxyethylene sorbitan monooleate) for both yeasts (Ale and Lager) (FIG. 4). Use of that detergent was thus effective in promoting further debittering by almost 4%. Of course, any surfactant susceptible to achieve such an increase of bitter compounds solubility would also be suitable. In this respect, it is worthwhile noting that in the series of Tweens tested, only Tween 80® which contains unsaturated fatty acids has been used successfully. Therefore, it is contemplated that any surfactant containing unsaturated fatty acids of a length of 12 to 20 carbon atoms, particularly those of 16 or 18 carbon atoms, will be as well performing, provided that these can effectively solubilize bitter compounds within a range of concentration of about 0.2% to about 20% v/v). In addition to the sweet taste obtained after debittering with Tween 80® (polyoxyethylene sorbitan monooleate), the yeast color changed from chocolate brown to cream white after treatment (Table 1).

TABLE 1

Effect of debittering on brewer's yeast color

| Yeasts | Color Index[c] | |
|---|---|---|
| | Before[a] | After |
| Ale | 13.6a[b] | 3.02b |
| Lager | 10.5a | 1.17b |

[a]Before and after debittering
[b]Means followed by the same letter are not significantly different (Duncan's Test, p ≦ 0.05)
[c]measured by the method of Dodds et al. (1991)

This secondary phenomenon results in a final product (lyophilized powder) that can be used in bakery without changing bread color, increasing then its commercial value. Furthermore, optimal conditions as determined above and Tween 80® (polyoxyethylene sorbitan monooleate) did not affect yeast protein content (% of dry matter) (Table 2).

TABLE 2

Approximate composition (% dry matter) of brewer's yeast before and after debittering

| | Before | | After | |
|---|---|---|---|---|
| Composition (%)[a] | Ale | Lager | Ale | Lager |
| Proteins | 45.00a[b] | 44.30a | 47.40a' | 46.60a |
| Fats | 1.32b' | 1.27b | 2.80a' | 2.80a |
| Carbohydrates | 36.91a' | 38.68a | 33.70b' | 33.80b |
| Ashes | 5.27a' | 5.75a | 7.70b' | 7.90b |

[a]Percents were evaluated relatively to a humidity of 10%
[b]Means in the same row and for the same yeast type followed by the same letter are not significantly different (Duncan's Test, p ≦ 0.05)

In order to verify our process, an assay on brewer's yeast from a local industrial brewery (La Portneuvoise) was carried out. While obtaining a 98% bitterness reduction, the yeast viability, before and after treatment, was estimated to 80%. These results are in agreement with Burton (1943) who asserted that yeast was still alive and able to grow after an alkali treatment to remove the bitter hop flavor.

EXAMPLE 3

Figure 5:
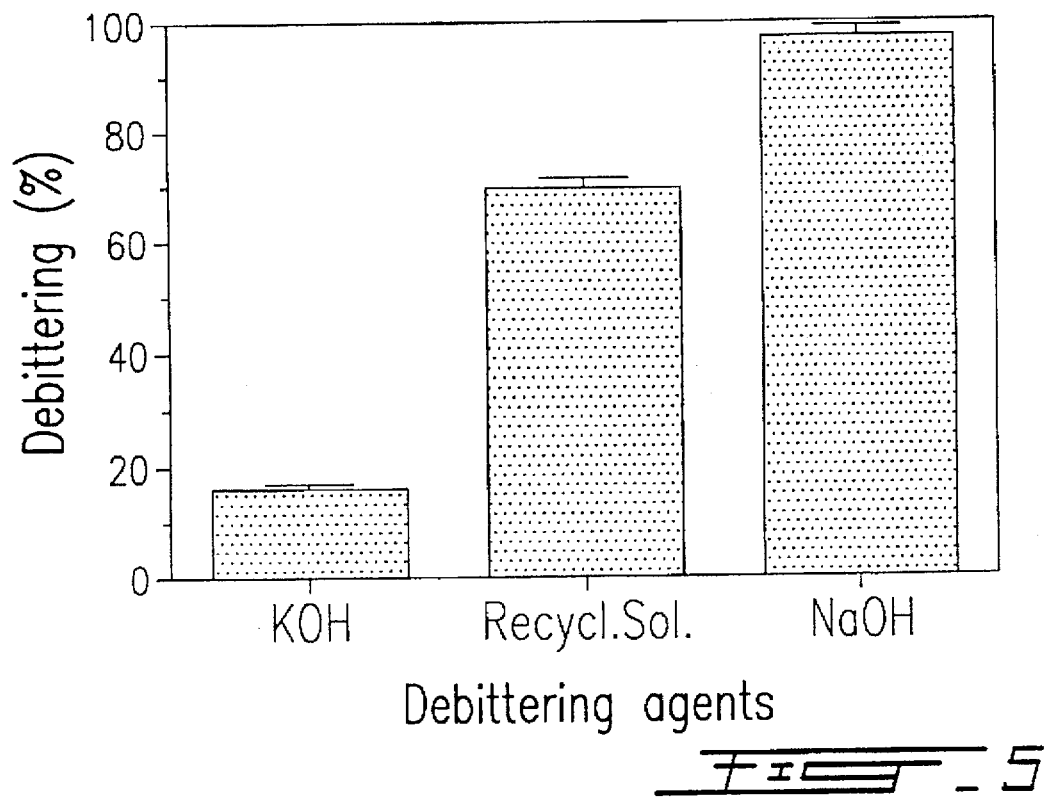
FIG. 5 represents the effect of potassium ion and of recycled sodium hydroxide in comparison with 2N sodium hydroxide, on bitterness reduction.

Potassium hydroxide (KOH), an other strong alkali, was then tested for its capacity to reduce bitterness. These experiments were carried out on spent brewer's yeast from 1a Portneuvoise. KOH was used at a concentration of 2N under the optimal conditions as determined above (pH 10.0, 50° C., 5 minutes, 50 rpm, 0.2% Tween 80® (polyoxyethylene sorbitan monooleate)). Bitterness reduction was less than 20% (FIG. 5), suggesting that bitter compounds have more affinity for $Na^{3O}$ than $K^{3O}$ ions in the present alkaline conditions.

In an other set of experiments, used supernatant recovered from previous tests with NaOH 2N was tested for debittering properties. Results show that this solution is still effective with a 70% bitterness reduction (FIG. 5), thus confirming the specificity of $Na^+$ ions. Furthermore, it can be seen from these experiments that $Na^+$ ions are largely in excess in the 2N solution, and the solution can be recycled. This approach opens then an economical avenue for industries where maximal debittering would not be essential or when one wants to minimize the causticity released in the environment.

EXAMPLE 4

Spent brewer's yeast, debittered according to our process, was first monitored for viability. Two yeast sources were tested, the first from brewery La Portneuvoise and the second from brewery Le Bar Inox. Their viability, before and after treatment, was compared with a control baker's yeast (Lallemand Inc., Montréal, Québec) by enumeration after staining with methylene blue and by culture on various media: Potato Dextrose Agar (Difco N. 0013-01-4), Malt Extract Agar (Difco N. 0112-01), Plate Count Agar (Difco No. 04-79-01-1) and Sabouraud Dextrose Agar (Difco No. 0109-2). Results show (Table 3) that our debittering process did not affect the viability of the two yeast strains which remained stable around 80% and 60% (La Portneuvoise and Le Bar Inox, respectively).

TABLE 3

Yeast viability (%) before and after debittering

| Brewer's Yeast | La Portneuvoise | Le Bar Inox |
|---|---|---|
| Before debittering | | |
| PDA[a] | 75b[b] | 64b' |
| SDA | 79b | 62b' |
| MEA | 67f | 56f' |
| PCA | 66f | 50f' |
| MBS | 78b | 66b' |
| After Debittering | | |
| PDA | 80b | 66b' |
| SDA | 81b | 64b' |
| MEA | 70f | 58f' |
| PCA | 64f | 52f' |
| MBS | 82b | 63b' |
| Baker's yeast (control) | | |
| PDA | | 100a |
| SDA | | 100a |
| MEA | | 92c |
| PCA | | 90c |
| MBS | | 100a |

[a]PDA: Potato Dextrose Agar
SDA: Sabouraud Dextrose Agar
MEA: Malt Extract Agar
PCA: Plate Count Agar
MBS: Methylene blue staining
[b]Means in the same column and in the same row followed by the same letter are not significantly different (Duncan's test, $p \leq 0.05$)

These results confirm thus the preliminary trials cited in Example 2. The viability value (80%), lower than that of the control yeast (100%), may be explained by the stress supported by yeast cells during beer production.

Activity of yeast cells freshly debittered was then evaluated by measuring their capacity to produce $CO_2$ from fermentation sugars. These experiments were realized by mixing each of the yeast strains with bread dough in special containers placed in a water bath at 38° C. and connected with a Rhizograph (R. Design, Pullmann, Wash. U.S.A.) which measured the volume of $CO_2$ generated in each container. Results (Table 4) show that there is no significant difference in $CO_2$ volumes produced before and after debittering for both brewer's strains.

TABLE 4

$CO_2$ production by yeast as measured with Rhizograph

| YEASTS | $CO_2$ (mL) |
|---|---|
| Baker's yeast (control) | 93.96a[a] |
| Portneuvoise before debittering | 56.70b |
| Bar Inox before debittering | 31.73c |

TABLE 4-continued $CO_2$ production by yeast as measured with Rhizograph

| YEASTS | $CO_2$ (mL) |
|---|---|
| Portneuvoise after debittering | 58.50b |
| Bar Inox after debittering | 33.45c |

[a]Means followed by the same letter are not significantly different (Duncan's test, $p \leq 0.05$)

However, the $CO_2$ production of La Portneuvoise and Le Bar Inox were approximately 50% and 30%, respectively, that of the control baker's strain. These results reflect again the stress supported by yeasts during beer production, a phenomenon which has been reported in the literature (Lisyuk et al., 1988). However, these results stress out that the viability of spent brewer's yeast is not in perfect concordance with its biological activity (reflected by $CO_2$ production).

The spent brewer's yeast activity being reduced, compared to control baker's yeast, it had to be considered to use it in various combinations with commercial baker's yeast, or, alone, in quantities larger than normally required. Therefore, we studied, with the same apparatus (Rhizograph), the $CO_2$ production of yeast mixtures in the following ratios (Debittered Brewer's Yeast (DBY): Baker's yeast (BKY)): 1:0, 2:1, 1:1, 1:2 and 0:1. Results show (FIG. 6) that ratios 1:1 and 1:2 gave $CO_2$ volumes statistically comparable to those produced by the control baker's yeast (ratio 0:1). Therefore a mixture 1:1 should be sufficient to meet the specifications required by bakeries.

Figure 7:
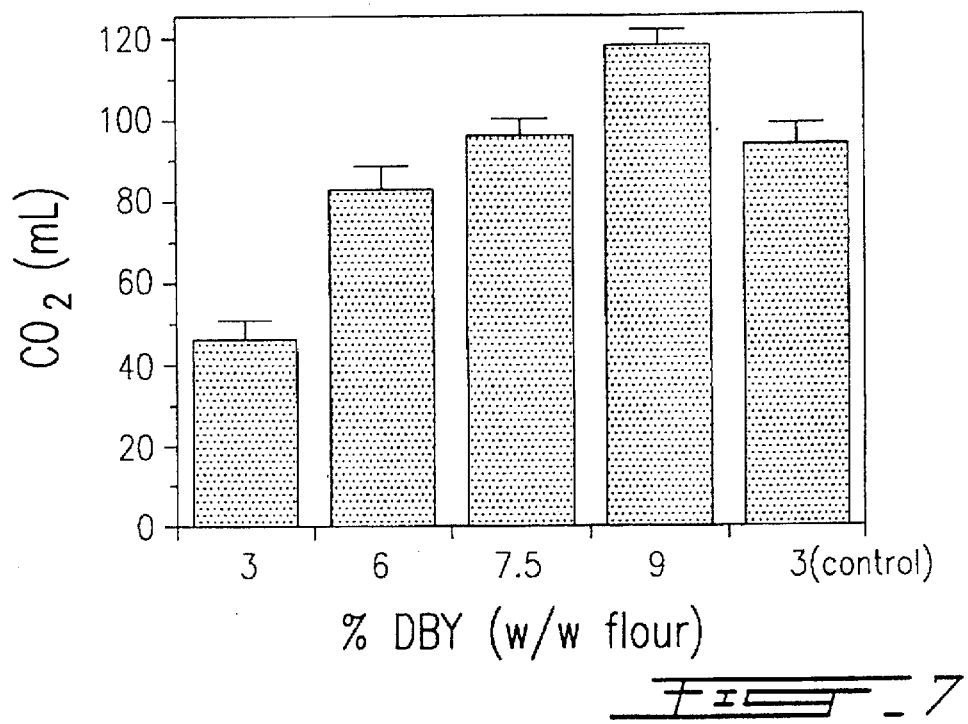
FIG. 7 represents the $CO_2$ production by various concentrations (expressed in % of weight) of debittered brewer's yeast (DBY) and baker's yeast (control) measured with the Rhizograph; DBY has been debittered with 0.2% Tween 80® (polyoxyethylene sorbitan monooleate)

We studied also the possibility of using debittered brewer's yeast alone by increasing the quantities by 1, 2, 2.5 and 3 times the yeast weight normally specified (corresponding respectively to 3, 6, 7.5 and 9% as expressed in % of flour weight). The 7.5 percentage (2.5×) gave $CO_2$ production comparable to the control baker's yeast while the 9% one (3×) overpassed the control $CO_2$ production (FIG. 7). Therefore, at the opposite of Grzymowski et al. (1979), we could consider the possibility of using brewer's yeast, debittered by our process, alone in bread dough by increasing its quantity by 2–3 times. This excess in yeast could only be beneficial as a supplementary nutritional source of protein, vitamin B, amino acids and minerals (Alian et al., 1983; Wade, 1983; Dziezak, 1987; Nand, 1987).

EXAMPLE 5

Bread-making trials have hence been conducted with debittered yeast used alone in excess or mixed with baker's yeast. Bread was made following the protocol of the Centre de recherche et de développement sur les aliments (CRDA, Agriculture Canada, St-Hyacinthe, Québec). The bread weight and volume were measured and organoleptic properties were evaluated by a panel of food science intervenors. After cooling for 20 minutes, bread volume was determined by the rapeseed displacement method and loaves were weighed. General evaluation of organoleptic characteristics of bread was then made, based on color, crust, crumb and transverse cut of bread. Bread was assigned a score of 4, 3, 2 or 1 for excellent, good, passable or unsatisfactory, respectively.

A first series of experiments studied mixtures of brewer's yeast from La Portneuvoise (DBY) with baker's (BKY) in various ratios (DBY:BKY): 0:1, 1:2, 1:1 and 2:1. Results of physical measurements (Table 5) show that there is no significant difference between the control (0:1) and mixtures 1:2 and 1:1. These results are in concordance with the $CO_2$ production by the same mixtures.

TABLE 5

Physical characteristics of bread made with mixtures of debittered brewer's yeast (DBY) and baker's yeast (BKY)

| DBY:BKY | Weight (g) | Volume (cm³) | Volume/weight (cm³/g) |
|---------|------------|--------------|------------------------|
| 0:1 | 91.74a* | 698a | 7.60b |
| 1:2 | 92.42a | 695a | 7.50b |
| 1:1 | 93.90a | 695a | 7.40b |
| 2:1 | 95.80a | 640b | 6.68a |

*Means in the same column followed by the same letter are not significantly different (Duncan's test, p ≦ 0.05)

Figure 6:
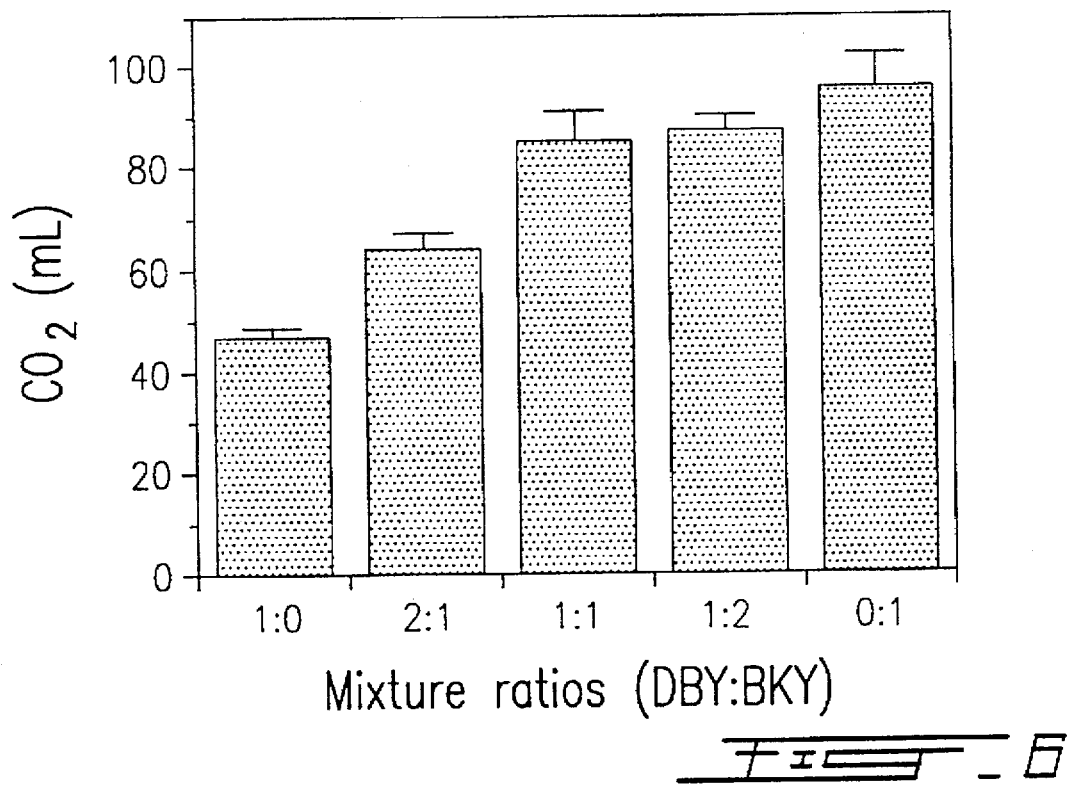
FIG. 6 represents the $CO_2$ production by various mixtures of debittered brewer's yeast (DBY) and baker's yeast (BKY) measured with the Rhizograph; DBY has been debittered with 0.2% Tween 80® (polyoxyethylene sorbitan monooleate)

Therefore, the ratio 1:1 should be retained, confirming the results of $CO_2$ production measurements (FIG. 6). Furthermore, the breads made with this same yeast ratio were the most appreciated, after the control, for their organoleptic properties (FIG. 8) and visual aspect (FIG. 9).

A second series of trials was conducted to demonstrate the possibility of using debittered brewer's yeast alone in breadmaking. Quantities varying from 2 to 3 times the quantity of baker's yeast normally required (corresponding to 6, 7.5 and 9% of the flour weight) have been tested. Weight and volume measurements (Table 6) of experimental breads are significantly different from control bread (baker's yeast 3%) showing lower volume/weight ratios.

TABLE 6

Physical characteristics of bread made with debittered brewer's yeast in excess (% w/flour w)

| Percentage (w/w) | Weight (g) | Volume (cm³) | Volume/weight (cm³/g) |
|------------------|------------|--------------|------------------------|
| Control (Baker's yeast, 3%) | 91.55a* | 694.50a | 7.57a |
| 6 | 102.34b | 632.25b | 6.20b |
| 7.5 | 101.93b | 665.00c | 6.52c |
| 9 | 101.02b | 670.50c | 6.64c |

*Means in the same column followed by the same letter are not significantly different (Duncan's test, p ≦ 0.05)

The visual aspect confirmed these measurements by the observation of smaller alveoli resulting from lower $CO_2$ production (FIG. 10). However, the experimental breads have been generally well accepted for their organoleptic qualities and, particularly, those containing 7.5 and 9% brewer's yeast (FIG. 8). Therefore, breads made with debittered brewer's yeast alone offer a new possibility of enlarging the market opening of consumers who care more for nutritional values and tradition-like food than for physical properties of commercial bread, especially lightness.

EXAMPLE 6

As stressed in Example 4, the viability of spent brewer's yeast before and after debittering was not in perfect concordance with its biological activity monitored by the $CO_2$ production. Therefore, it would be desirable to further ameliorate the process in order to restore the biological activity of debittered yeasts.

The $CO_2$ production is known to be higher for baker's yeast than for brewer's yeast (Chen and Chiger, 1985). The comparison of the lipid composition of brewer's yeast and of baker's yeast shows that the latter is richer in unsaturated lipids and in sterols. Therefore, if the unsaturated lipid composition of brewer's yeast could be modified (to reach the composition of baker's yeast), we felt that it might change the brewer's yeast biological activity and increase its ability to produce $CO_2$.

When referring to a study conducted with *Saccharomyces uvarum* (Ahvenainen, 1982), the unsaturated lipidic acids represent 86% of total lipidic acids in aerobic yeasts, compared to 38% in anaerobic yeasts. Palmitoleic and oleic acids are the main lipidic acids in aerobic yeasts while palmitic and stearic acids are the main lipidic acids in anaerobic yeasts. When grown in aerobic and in anaerobic conditions, the composition in phosphoglycerides, triacylglycerols and sterols decrease from 78 to 42%, 81 to 19% and 94 to 39%, respectively. The quantity of the same components in mg per gram of yeast dry weight when measured in aerobic and in anaerobic conditions decrease from 22 to 16, 18 to 6 and 5 to 1, respectively. Conversely, when grown from anaerobic to aerobic conditions, the synthesis of unsaturated lipids, which depends on the presence of oxygen, increases from 38 to 70% within 3 hours. Palmitoleic acid synthesis seems to be the main component contributing to this increase. Also, synthesis of sterols, principally ergosterol, requires oxygen and is increased in aerobic conditions. One of the functions of unsaturated lipids is to increase fluidity and permeability of the cellular membranes. Surfactants, like Tween 80® (polyoxyethylene sorbitan monooleate), are unsaturated lipidic acids and could mimic the role of natural unsaturated lipids.

The working hypothesis was therefore to conduct assays of $CO_2$ production using debittered brewer's yeasts with different concentrations of Tween 80® (polyoxyethylene sorbitan monooleate), extending from 0.2 to 20% and to allow the so debittered yeasts to replenish their biological intracellular components by growing them for different periods of time in nutrient media.

After fermentation, spent brewer's yeast (Ale, Redstar brand name) was debittered under the same optimized conditions as above except that the concentrations of Tween 80® (polyoxyethylene sorbitan monooleate) were varied from 0.2 to 20%.

After recovering by centrifugation, these yeasts were separated in two groups and grown in two media. The first medium was containing only sucrose (30 g/l) while the second medium which was called the optimal medium was made of (g/L) $KH_2PO_4$ 7.0, $Na_2HPO_4$ 2.0, $MgSO_4 \cdot 7H_2O$ 1.5, yeast extract 1.5, $CaCl_2 \cdot 2H_2O$ 0.1, $(NH_4)_2SO_4$ 1.5 and glucose 30 (pH adjusted to 5 with concentrated phosphoric acid).

The yeasts were used to inoculate these two media (1%, w/v), grown at 30° C. under agitation speed of 300 RPM, for a maximal six hour period. Every 2 hours, an aliquot was taken and analyzed for $CO_2$ production. The agitation speed can obviously be modified and the time of reactivation can change accordingly.

For $CO_2$ production analysis, one gram of wet yeasts (20% of total solids) was resuspended in an erlenmeyer flask containing 50 mL of twice-distilled water. 20 mL of this suspension was added to another erlenmeyer containing 10 mL of sucrose solution (2%, w/v). After mixing, this solution was poured into a fermentation glass tube. For comparison, commercial dry baker's yeast was prepared by the same method and the quantity of yeasts was calculated upon 10% of total solids. This fermentation system allows a visual reading of the quantity of $CO_2$ produced at the top of the liquid column. The readings were taken every 20 minutes during 2 to 3 hours.

With the aid of an hemacytometer, the viability percentage was evaluated by coloration with methylene blue. The total solids were measured by adding one gram of wet debittered yeast in one milliliter of ethanol, homogenizing and pouring onto a previously weighed aluminium plate. The homogenate was dried in a stove at 110° C. for four hours. It was then chilled in a desiccator for a one hour period and weighed. All experiments were done in duplicate.

FIGS. 11 and 12 show that the longer the period of reactivation, the shorter the time for producing the same quantity of $CO_2$. FIG. 11 shows that the optimal medium is more suitable in achieving this goal than sucrose alone. FIG. 12 demonstrates that the speed of production of $CO_2$ can be improved by a six fold increase in a 6 hour period of reactivation. The six hour period of reactivation provides the debittered yeasts to be even more active than the commercial dry yeasts. The percentage of viability of the dry yeasts is diminished by storing and rehydration, which therefore decrease their activity. One can expect that, if we lyophilised the so debittered and reactivated spent yeasts before the $CO_2$ production test instead of using wet yeasts, we might not have observed such a difference between dry and spent yeasts. For easy manipulation and storage, these treated spent yeasts can be lyophilised and stored for further use.

After a two hour period of reactivation, the viability of the debittered yeasts is 100% while the time for producing the same quantity of $CO_2$ is half the time required for the non-reactivated yeasts.

FIG. 13 shows how different is the ability of producing $CO_2$ of the yeasts debittered in presence of 0.2% versus 20% Tween 80® (polyoxyethylene sorbitan monooleate).

Therefore, debittering spent brewer's yeasts with larger concentrations of Tween 80® (polyoxyethylene sorbitan monooleate), followed by reactivation in a suitable medium replenish the biological activity of these yeasts, as demonstrated by their ability to produce $CO_2$. The restored biological activity could also be monitored by yeast's ethanol production, using anaerobic growth conditions. It would be reasonable to expect that ethanol production by these yeasts would also be restored because the addition of Tween 80® (polyoxyethylene sorbitan monooleate) had for primary goal to permit an increased permeability of the cellular membranes in order to facilitate the uptake of nutrients and, accordingly, to accelerate the reestablishment of biological functions of the yeasts, that is, $CO_2$ and ethanol production. As these yeasts, depending upon the aerobic or anaerobic conditions in which they are grown, can produce $CO_2$ or ethanol, respectively, it is assumed that these reactivated yeasts would be as useful in spirit and beer production as in bread-making. Thus another interesting avenue is opened for spent brewer's yeasts: recycling to produce alcohol again.

Even though reactivation tests have been practised with Tween 80®, it is deemed that other surfactants containing unsaturated fatty acids will also perform as well. Since in aerobic conditions, the synthesis of unsaturated lipids increases, particularly palmitoleic acid synthesis, there is no apparent reason why only Tween 80® could be used. Therefore, surfactants having C12 to C20 unsaturated fatty acids, particularly those containing C16 and C18 unsaturated fatty acids are deemed equivalent in the present process. Of course, surfactants acceptable in food industry are to be chosen, as such is the case for Tween 80®.

The yeasts debittered and reactivated by the described process could be used in bread-making alone and not necessarily in excess, when compared to debittered yeasts in presence of 0.2% Tween 80® (polyoxyethylene sorbitan monooleate) and not reactivated. The production of $CO_2$ is such that it can be expected that these yeasts so reconditioned could advantageously replace baker's yeasts in bread-making, giving a product having the same lightness and the same organoleptic properties than a product currently prepared with baker's yeasts (ordinary white bread). The yeasts recovered by the two variations of the instant process could then respond to a larger range of consumer's taste. Moreover, as stated before, the reactivated yeasts can also be used in spirit and beer production. The two embodiments of the present invention thus provide a large repertoire of uses for spent brewer's yeasts and an interesting solution to environmental problems.

REFERENCES

Ahvenainen, J. (1982). Lipid composition of aerobically and anaerobically propagated brewer's bottom yeast. J. Institute of Brewing 88: 367–370.

Alian, A., et al. (1983). "Enrichment of local bread with dried brewery yeast. Chemical and biological evaluation of dried brewery yeast and flour". Egyptian J. Food Sci. 11: 23

Anonymous. (1977). "Brewery by-products—A source of extra profit". Brewing and distilling international. 7(4): 12

Anonymous. (1983). (10th Ed.) The Merk Index. Merck and Co. Inc., Rahway, N.J. (U.S.A.)

Anonymous. (1984). "No-caffeine "cocoa" flavor Brewers'yeast product earn in cookies". Bakers' Digest, 58(4): 30

Asenova, E. K., et al. (1984). "Utilisation of preparations made of brewers' yeast sediments in the food industry". Fermentnaya-i-Spirtovaya Promyshlennost. 4: 17

Bauer, K., et al. (1975). "Process for extraction of hops". German Federal Republic Patent Application. 2: 530

Bishop, L. R. (1967). "European Brewery Convention. The E.B.C. scale of bitterness". J. Inst. Brew. 73: 525

Burton, L. V. (1943). "Vitamin-rich food made from byproduct yeast". Food Industries. 15: 66

Chen, S. L. and Chiger, M. (1985). Production of baker's yeast. Comprehensive biotechnology. S. Drew, D.I.C. Wang and H. Blanh. Oxford Ed. Pergamon Press 3: 429–461.

Dodds, G. T., et al. (1991). "Surface color changes of tomato and other solanaceous fruit during chilling". J. Amer. Soc. Hort. Sci. 116: 482

Dziezak, J. D. (1987). "Yeasts and yeast derivatives characteristics and processing". J. Food Tech. 41: 104

East, E. et al. (1966). "Yeast products and their role in food development". Food Manufacture. 41: 62

Filippovskii, A. V., et al. (1985). "Activation of invertase in sedimental brewers' yeast used for inversion of sugar syrup". Izvestiya Vysshikh Uchebnykh Zavedenii, Pishchevaya Tekhnologiya 2: 113

Grzymowski, R., et al. (1979). "Potential utilization of brewers' yeast in baking". Przemysl Fermentacyjny I Owocowo-Warzywny 23(2): 4

Hoggan, J. (1979). Yeast as a by-product". Brewer. 65(771): 7

Jakubczyk, T. et al. (1972). "Use of brewer's yeast in breadmaking". Przeglad Piekarski I Cukieniczy. 20(5): 101

Jeane, C. J. (1977). "Yeasts in pasta formulation. Yeast for food and other purposes". Food Tech. Rev. 45: 254

Kann, A. G., et al. (1982). "Possible applications for brewing by-products". Tallinna Poluetehnilise Instituudi Toimetised (537): 21

Krauss, G. (1971). "Losses of bitter in brewing". Monatsshift Fuer Brauri. 24: 304

Lisyuk, G. M., et al. (1988). "Physico-biochemical aspects of repeated use of *Saccharomyces carlsbergensis*".

Izvestiya Vyshikh Uchebnykh Zavedenii, Pishchevaya Tekhnologiya. 3: 125

Marth, E. H. (ed). (1978). "Standard Methods for the Examination of Dairy Products". 14th Ed., American Public Health Ass., Washington, D.C., (U.S.A.)

Modic, P., et al. (1977). "Nutritive and technological properties of protein preparation produced from brewer's". Proc. Europ. Meet. Meat Res. Workers 2302:(1–2): 15

Modic, P., et al. (1978) "Nutrition and technological properties of a protein preparation made from brewer's yeast". Technologija-Mesa. 19: 194

Montgomery, D. C. (1976). "Design and analysis of experiment". John Wiley & Sons, New York, N.Y. (U.S.A.)

Nand, K. (1987). "Debittering of spent brewer's yeast for food purposes". Die Nahrung. 31: 127

Peppler, H. J. (1970). "The yeasts". Vol. 3, Rose, A. H., et al. (Eds). Academic Press, London, UK.

Rodmey, P. J. (1987). "Measures of yeast death and deactivation and their meaning". Part I, Process Biochem. 1: 118

Rousef, L. R. (1990). "Bitterness in foods and beverages". Dev. Food Sci. 25: 8

Smith, A. J. T. (1979). "Recovery and handling of surplus yeast". Brewer's Guardian. 108(6): 35

Versele, M. (1986). "Centenary review—100 years of hop chemistry and its relevance to brewing". J. Inst. Brew. 92: 32

Wade, C. (1983). Carlson Wade's vitamins, minerals and their supplements". Rev. and update. New Canaan, Can, Keats Pub. xii, 148 p.

What is claimed is:

1. A process for debittering spent brewer's yeast which comprises the following steps:

adding to a yeast suspension a quantity of polyoxyethylene sorbitan monooeleate to achieve a final concentration comprised between about 0.2% to about 20% (v/v), adjusting the pH of said yeast suspension to about 10 with NaOH 2N, agitating said suspension at a speed of 50 to 150 rpm during a period of time comprised between about 5 to about 60 minutes at a temperature of about 30° to about 50° C., recovering said yeast, and washing said yeast with water, whereby the recovered yeast is substantially free of bitter compounds.

2. A process according to claim 1, wherein the added surfactant achieves a concentration of 0.2% (v/v).

3. A process according to claim 1, wherein the added surfactant achieves a concentration of 20% (v/v).

4. A process according to claim 3 further containing a step of reactivation of said debittered yeast which consists in growing said debittered yeast in a medium containing fermentation sugars, at a temperature compatible with growth of said yeast under agitation for a period of time sufficient for such reactivation to occur.

5. A process according to claim 4 wherein the medium is a solution containing (in g/L): $KH_2PO_4$ 7.0, $Na_2HPO_4$ 2.0, $MgSO_4.7H_2O$ 1.5, yeast extract 1.5, $CaCl_2.2H_2O$ 0.1, $(NH_4)_2SO_4$ 1.5 and glucose 30 and having a pH adjusted to 5 with concentrated phosphoric acid.

6. A process according to claim 5 wherein reactivation of the debittered yeast is performed at 30° C. under agitation speed of 300 rpm for 2 to 6 hours.

7. A process according to claim 6 wherein reactivation of the debittered yeast is monitored by the speed of $CO_2$ production of said reactivated yeast in a fermentation tube containing a 2% sucrose solution and wherein said speed of $CO_2$ production is improved by a 6-fold increase after a 6 hour period of reactivation when compared to the speed of $CO_2$ production measured on non-reactivated debittered yeast.

8. A process according to claim 7 wherein the debittered yeast is lyophilised and stored for further use.

* * * * *